(12) United States Patent
Hoeflin et al.

(10) Patent No.: US 8,533,819 B2
(45) Date of Patent: Sep. 10, 2013

(54) METHOD AND APPARATUS FOR DETECTING COMPROMISED HOST COMPUTERS

(75) Inventors: David A. Hoeflin, Middletown, NJ (US); Anestis Karasaridis, Oceanport, NJ (US); Carl Brian Rexroad, Oak Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 900 days.

(21) Appl. No.: 11/540,827

(22) Filed: Sep. 29, 2006

(65) Prior Publication Data

US 2008/0080518 A1    Apr. 3, 2008

(51) Int. Cl.
*H04L 29/06* (2006.01)

(52) U.S. Cl.
USPC .. 726/22; 706/11; 726/6; 726/23; 370/395.42

(58) Field of Classification Search
USPC ............... 706/11; 726/6, 22, 23; 370/395.42
See application file for complete search history.

(56) References Cited

U.S. PATENT DOCUMENTS

| 2004/0221190 A1 | 11/2004 | Roletto |
| 2006/0026669 A1* | 2/2006 | Zakas .............................. 726/6 |
| 2006/0185014 A1* | 8/2006 | Spatscheck et al. ............ 726/23 |
| 2008/0010225 A1* | 1/2008 | Gonsalves et al. .............. 706/11 |
| 2008/0028463 A1* | 1/2008 | Dagon et al. .................... 726/22 |

OTHER PUBLICATIONS

Anukool Lakhina/ Mark Crovella/ Christophe Diot, "Detecting Distributed Attacks using Network-Wide Flow Traffic", 2005 pp. 1-3.*
EP Search Report and Opinion for EP 07115453.8, Jan. 16, 2008, consists of 6 unnumbered pages.
S. Racine, "Analysis of Internet Relay Chat Usage by DDos Zombies", Master's Thesis, Apr. 26, 2004.
E. Cooke, et al., "The Zombie Roundup: Understanding, Detecting and Disrupting Botnets", Proceedings of the Steps to Reducing Unwanted Traffic on the Internet, Jul. 7, 2005, pp. 39-44.
H. Dreger, et al., "Dynamic Application-Layer Protocol Analysis for Network Intrusion Detection", Proceedings of the 15th Usenix Security Symposium, Jul. 31, 2006, pp. 257-272.
A. Karasaridis, et al., "Wide-Scale Botnet Detection and Characterization", Proceedings of the Workshop on Hot Topics in Understanding Botenets, Apr. 10, 2007.
Examination Report for EP 07115453.8, Feb. 10, 2009, consists of 3 unnumbered pages.

* cited by examiner

*Primary Examiner* — Jeffrey Pwu
*Assistant Examiner* — Michael D Anderson

(57) ABSTRACT

A method and apparatus for detecting compromised host computers (e.g., Bots) are disclosed. For example, the method identifies a plurality of suspicious hosts. Once identified, the method analyzes network traffic of the plurality suspicious hosts to identify a plurality suspicious hub-servers. The method then classifies the plurality of candidate Bots into at least one group. The method then identifies members of each of the at least one group that are connected to a same controller from the plurality suspicious controllers, where the members are identified to be part of a Botnet.

13 Claims, 5 Drawing Sheets

METHOD AND APPARATUS FOR DETECTING COMPROMISED HOST COMPUTERS

The present invention relates generally to protection of networks and, in particular, to a method and apparatus for detecting compromised host computers.

BACKGROUND OF THE INVENTION

Many of today's business and consumer applications rely on communications infrastructures such as the Internet. Businesses and consumers need to provide protection to their computer systems from hostile activities, e.g., denial of service attacks, spam, etc., while being able to communicate with others via the infrastructure. However, attacks by a network of compromised host computers (a Botnet) are often disguised as legitimate activity. For example, an attacker may use a large number of broadband connected home computers as Botnets along with Internet chat servers as controllers, in order to hide the activity behind legitimate Internet chat sessions. Detection of these Botnets requires collection and analysis of massive amount of packet traffic at the application layer. The required computation is difficult if not prohibitive.

Therefore, there is a need for a method and apparatus that enable network service providers to detect one or more networks of compromised host computers (Botnets).

SUMMARY OF THE INVENTION

In one embodiment, the present invention discloses a method and apparatus for detecting compromised host computers (e.g., Bots). For example, the method identifies a plurality of suspicious hosts. Once identified, the method analyzes network traffic of the plurality suspicious hosts to identify a plurality suspect controllers. The method then classifies the plurality of suspicious hosts into at least one group. The method then identifies members of each of the at least one group that are connected to a same controller from the plurality suspect controllers, where the members are identified to be part of a Botnet. In one embodiment, the method then provides a list of the most suspicious hub-servers acting as controllers and a list of Botnets (or most likely to be Botnets) to the user, e.g., in the form of a report.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for detecting compromised hosts on packet networks such as Internet Protocol (IP) networks using IPv4 & IPv6 protocols. Although the present invention is discussed below in the context of IP networks, the present invention is not so limited. Namely, the present invention can be applied for other networks.

Figure 1:
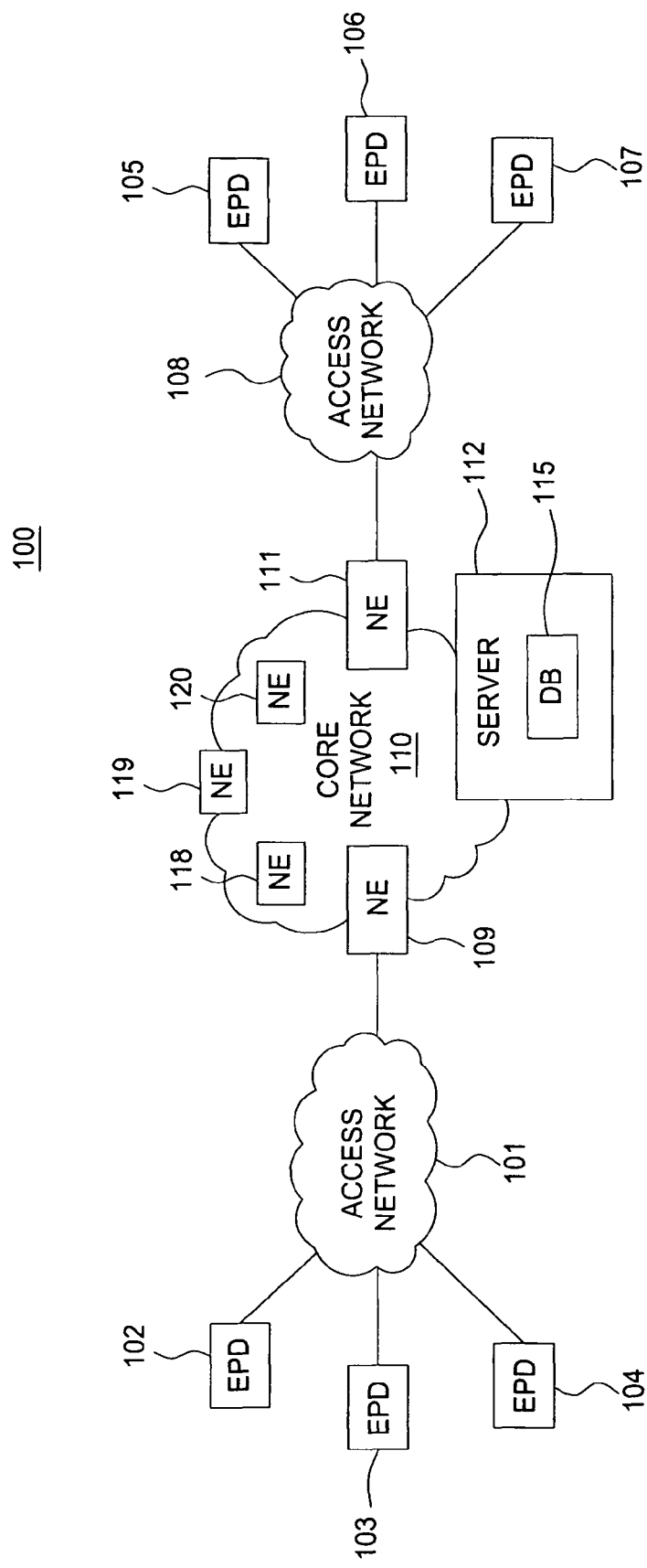
FIG. 1 illustrates an exemplary network related to the present invention.

FIG. 1 is a block diagram depicting an exemplary configuration of a communication system 100 constructed in accordance with one or more aspects of the invention. In one embodiment, a plurality of endpoint devices 102-104 is configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and five network elements (NEs) are depicted in FIG. 1, the communication system 100 may be expanded by including additional endpoint devices, access networks, and network elements without altering the present invention.

The endpoint devices 102-107 may comprise customer endpoint devices such as personal computers, laptop computers, personal digital assistants (PDAs), servers, and the like. The access networks 101 and 108 serve as a conduit to establish a connection between the endpoint devices 102-107 and the NEs 109 and 111 of the core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the core infrastructure and interface with customer endpoints over various types of access networks. An NE is typically implemented as an edge router, a media gateway, a border element, a firewall, and the like. An NE may also include a component that resides within the network (e.g., NEs 118-120) such as a honeypot, a tarpit, a mail server, or like devices. Similarly, an NE may be responsible for providing data to an application server 112 for the layers it supports, e.g. transport layer, application layer, etc.

For example, at the application or packet layer, a flow (or flow data) may comprise a set of packets wherein each packet of the flow is characterized by the same source IP (SIP) address, destination IP (DIP) address, source port (sport), destination port (dport), and/or IP protocol. A flow record may also include information about the number of packets exchanged and number of bytes exchanged in a given flow as well as a start time and an end time. A flow may also include flag information that indicates the characteristics and status of the flow. Otherwise, various time-out rules are used to define the end of a flow. An NE used at the transport layer may provide data at the circuit layer, e.g., 622 Mbps, 155 Mbps, etc. circuits. The core network 110 may also comprise an application server 112 that contains a database 115. The application server 112 may comprise any server or computer that is well known in the art (e.g., see FIG. 5 below). In one embodiment of the present invention, the server 112 comprises a dedicated application server that is configured to detect compromised computers and to alert customers (e.g., enterprise customers). The database 115 may be any type of electronic collection of data that is well known in the art. The database 115 is used by the server 112 to store lists of suspicious hosts, servers, controllers, etc.

The above IP network is described to provide an illustrative environment in which data are transmitted and networks are monitored. For example, commercial network service providers and enterprise network service providers need to monitor the network for security, performance, and reliability purposes. However, attacks by a network of compromised host computers (a Botnet) disguised as legitimate activity continue to occur. For example, attackers may use a large number of broadband connected home computers as Botnets along with Internet chat servers as controllers to hide their activities behind legitimate Internet chat sessions. The current method for detection of these Botnets requires collection and analysis of massive amount of data at the application layer. The processing of large amount of data is costly and in most cases prohibitive for large networks. Furthermore, the massive data collection and analysis delays the detection of compromised computers enabling the attackers to evolve their network and approach. Timely detection of the compromised controllers and hosts would enable the network service provider to provide appropriate network security and notification to customers. Therefore, there is a need for a method that enables network service providers to detect networks of compromised host computers (Botnets).

In order to better describe the invention, the following networking terminologies will first be provided:

Bots;
Botnets;
Master hosts; and
Controller or controller hosts.

Bots are compromised hosts that are remotely controlled by a master host via a controller host as defined below. Botnets are networks of "Bots" that are controlled remotely to perform illegitimate activities such as to start large-scale Denial of Service (DoS) attacks, send Spam, distribute stolen digital content, etc. Botnets often participate in massive host exploitations in order to recruit new Bots into the Botnet. The victims of Botnet operators may include the organizations or individuals that own or maintain the hosts that become Bots, the targets of the DoS attacks and the owners of the intellectual property being traded without fees (e.g., illegal downloads of multimedia information), among others. Botnets may be set up for implementing malicious or mischievous activities or for generating profits. The profit aspect comes into play when Bots become servers for activities that have certain commercial value such as email relaying, hosting for phishing sites, distributed storage, etc. In the case of Botnets setup for profit, the Botnet operators (perpetrators) sell the rights for the use of the resources they have captured. For this reason, the activities of setting up Botnets have evolved from an amateurish state to a professional state by the commissioning of skilled individuals.

A master host is a computer used by a perpetrator to issue commands that are relayed to the Bots via the controller(s). A controller (or controller host) is typically a server that has a legitimate purpose, e.g. an Internet Relay Chat (IRC) server used for relaying chat messages among users. This way, Bots may hide behind legitimate traffic and are not easily traceable. The controller may also be another compromised host that plays the role of a coordinator.

Figure 2:
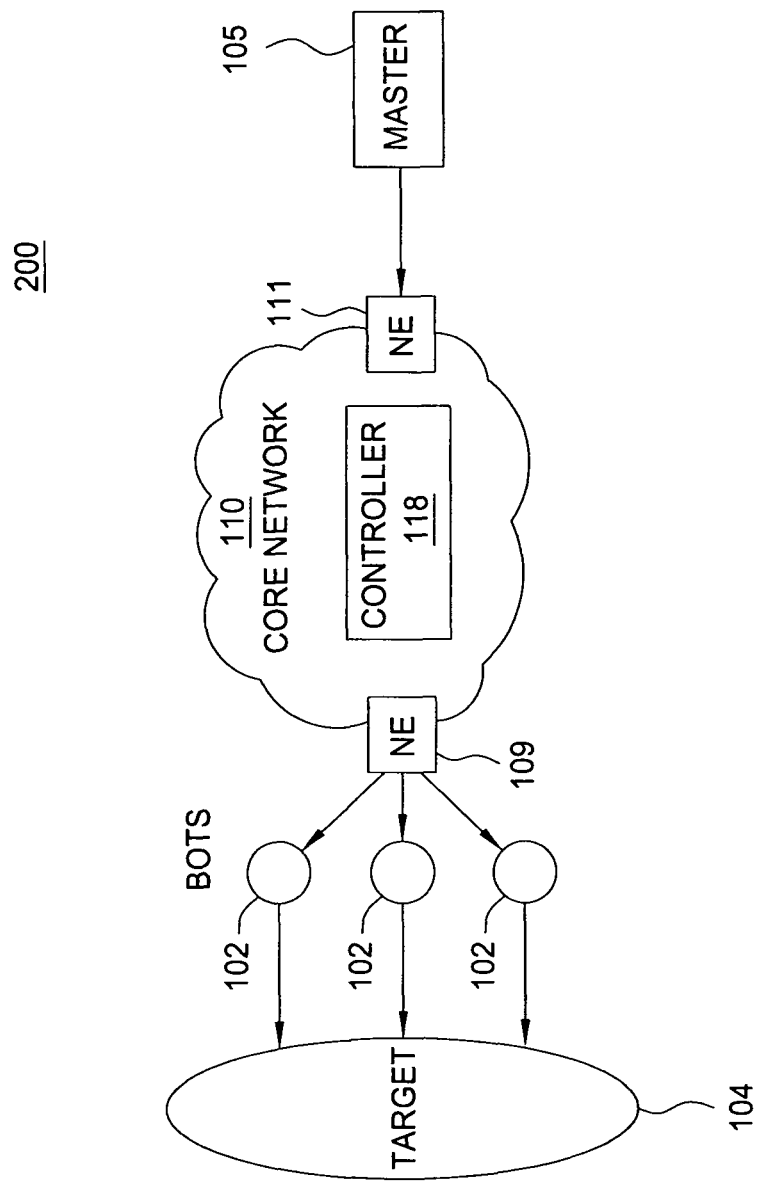
FIG. 2 illustrates an exemplary network with a master host, controller, Bots and potential targets.

FIG. 2 provides an exemplary network 200 that illustrates the relationship among the master host, the controller, the Bots and potential targets. For example, the master host 105 may be connected to a core network 110 through a gateway network element 111. A perpetrator may use a server 118 deployed in the service provider's network as the controller and the endpoint devices 102 as the Bots. The Bots 102 are connected to the service provider's core network via the gateway network element 109. The target endpoint device(s) 104 can then be attacked via the Bots 102 controlled remotely by the master host 105. It should be noted that the attacks on the endpoint device(s) 104 shown as arrowed lines emanating directly from the bots 102 are purely illustrative. Those skilled in the art will realize that the attacks emanating from the bots 102 may need to traverse over one or more networks.

The master host may use a large number of compromised hosts as Bots. For example, the Bots may be broadband connected home computers or university servers that may not be secure. Additionally, to avoid sudden shutdowns when the controllers are detected, the master hosts may use multiple controllers or establish direct communication among each other. The master hosts also try to spread and clone themselves to increase their usability. The current invention provides a method for detecting Botnets in a network. The method utilizes a scalable non-intrusive method based on flow records collected on transport layer network links. The analysis is performed on transport layer information and thus does not depend on the particular application layer protocol.

In one embodiment, the flow records may contain summary information about sessions between a single source address/port (sip/sport) and a destination address/port (dip/dport). A single flow record may then contain the number of packets, bytes, and an OR function of the flags used (if TCP is the transport layer protocol), the start time and end time of the flow and the transport layer protocol used.

Once the flow records for all the traffic through the network are collected, the subset of flows to be processed needs to be identified. For example, monitoring systems may provide scan records that identify computers performing scanning activity, and circuits on which scanning activity has increased relative to an adaptive baseline. The scan records may also identify the ports scanned and the time periods of the scans. In another example, monitoring systems may provide worm alarms that identify increases of sources scanning a particular port to find vulnerable applications. In one embodiment, the scan records and worm alarms enable a service provider to adaptively select the circuits to be targeted for analysis as circuits that are most likely to carry Botnet traffic. In another embodiment, a fixed set of circuits and ports may be monitored for Botnet activity. This enables the service provider to perform a long term analysis of the circuits and ports that are frequently used by Botnets, and to establish a well known behavior pattern of Botnets using controller hosts such as an IRC server.

In one embodiment, the current invention uses scan records and worm alarms to initially identify a list of suspicious hosts. Namely, suspicious hosts are computers that have been identified in scan and worm alarm records as having performed suspicious scan activities. The method then collects all flow records generated by the suspicious hosts (e.g., included in scan and worm alarm records). The method then determines what other activities are performed by these suspicious hosts. If a computer (suspicious host) has established a connection to a hub-server (such as an IRC server) in addition to being identified as having performed suspicious scanning, then the suspicious host is elevated to a candidate Bot.

In one embodiment, IRC traffic for the suspicious hosts may be analyzed on typical IRC ports which are for example 6667, 6660-6, 6668, 6669, and 7000 (all TCP) to identify controller host. Note that flows may not be completed either due to routing issues, collection limitations, malware, etc. The analysis may consider flows that have at least the Ack or Ack/Push TCP flags. This enables the analysis to capture heartbeat packets that often appear in single-packet flow records with either an Ack or Ack/Push TCP flags.

In another embodiment, hub-servers (such as the IRC server) on all ports are tracked in order to identify central hubs of communication on non-typical ports. This approach requires massive amount of monitoring, data collection and analysis. Botnets may use non-typical IRC ports to connect to the controllers. That is, the IRC servers may be configured or programmed to run on any port. Identification of the controller hosts is challenging since the ports to be monitored are not known in advance. In many cases, the control traffic masquerades as traffic from some other well-known application. For example, Worm/Bot W32.Spybot.ABDO uses port 53/TCP for its IRC communication with the controller. Note here that 53/TCP is typically used for large DNS packets. In addition, Bots may start or end their TCP connections to their controllers at different times that are dispersed based on the time the Bots get compromised and other factors such as the time the compromised host (Bot) is powered on. For this reason, a large number of IRC flows generated simultaneously from all the Bots is not likely to occur. Therefore, long term monitoring may be required to identify the controller hosts with higher certainty.

In one embodiment, communications between suspicious hosts and suspicious servers are summarized and recorded individually for long term monitoring. Information such as the port used on the suspicious server host, the number of flows, packets and bytes transferred between the suspicious host and the suspicious server host may be stored after each monitoring interval, e.g. hour, etc. These records may later be parsed to identify suspicious hub-server hosts that have multiple candidate Bots connecting to them, thus identifying suspect controller hosts. Thus, the method needs to initially detect servers that are operating as "hub-servers", i.e. servers that have multiple connections from many suspicious hosts.

Figure 3:
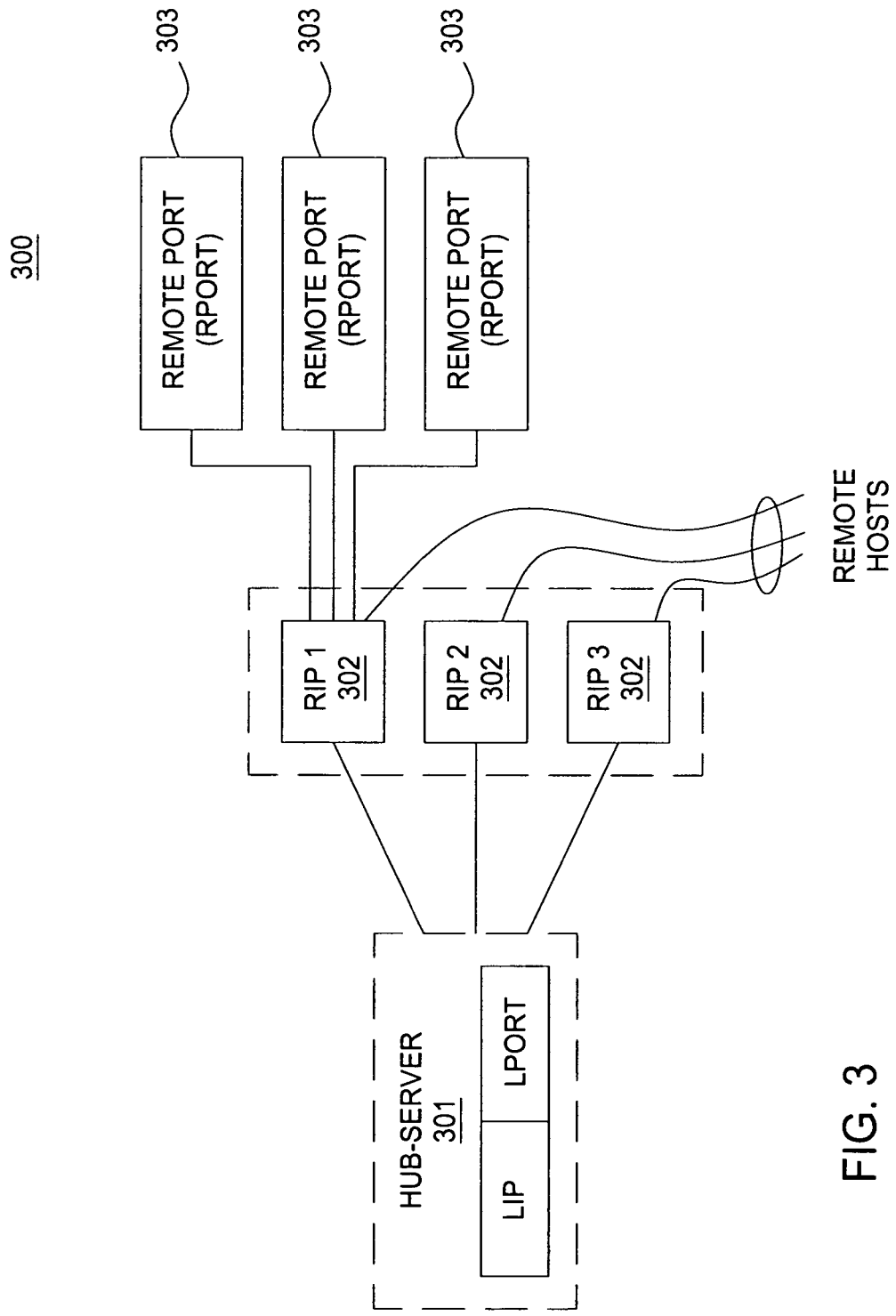
FIG. 3 illustrates connectivity of a hub-server.

FIG. 3 illustrates connectivity 300 of a hub-server with a plurality of hosts 302. In FIG. 3 "lip" represents a local IP address, "lport" represents a local port, "rip" represents a remote IP address, and "rport" represents a remote port. In one example, a local port on a hub server 301 may be associated with multiple rips (e.g., rip 2 and rip 3) of remote hosts 302. In another example, a local port on the hub-server 301 may be associated with a single rip (e.g., rip 1) of remote host 302, but with multiple rports 303 through the single rip. In one embodiment, the present method identifies pairs of "lip"/ "lport" that have associations with multiple "rips," or with a single "rip" with multiple "rports". The associations are built by processing flow records of suspicious hosts in predetermined intervals, e.g., every 30 minutes, hourly and so on. Cases of hosts whose total traffic is analyzed, e.g., hosts that were identified by a worm alarm, that are also hub-servers are included. Therefore, the processing is done on both the source and destination IP addresses of the flow records. In one embodiment, the processing of flow records may comprise of the following stages:

Capturing all flow records related to a set of suspicious hosts;

Storing data that includes the number of flows, packets, bytes, first and last flow timestamp in memory based on keys that involve the 4-tuples (lport, lip, rip, rport);

Parsing the data in memory and finding pairs (lport, lip) that are associated with multiple rips or rports;

Generating reports of such associations and storing them in non-volatile memory (e.g., hard drive) for later inspection/parsing.

In one embodiment, the reports may contain the following data for each suspicious client-hub-server" association: suspicious client, hub-server, hub port, number of flows, number of packets, number of bytes, and timestamp of the last flow. For this type of analysis, the method may filter in only TCP flows which contain at least one packet with the Ack flag. This allows filtering out a lot of the noise associated with UDP traffic (e.g., IRC runs on top of TCP) and other TCP flows that are not complete, due for example to scanning, measurement limitations, buggy software, lost packets, etc.

Since suspicious hub-servers may be used for multiple purposes such as distributed storage (using for example ftp, tftp, xdcc, http, etc.), peer to peer communications, or to provide other legitimate services, the present method needs to classify which of the hub-servers and hub ports are used for control. In one embodiment, the present method classifies their traffic by modeling the known control traffic flows using certain attributes. For example, controlling IRC servers generate IRC Ping messages to verify that their clients are connected, etc. If the clients are connected they are required to generate an IRC Pong message as soon as possible. These messages generate flows that show periodic patterns for a given client-server pair. Also the flow records contain few packets with Syn/Ack, Push/Ack or Ack flags.

Table 1 below provides an example of a set of flows with the characteristics described above. Namely, table 1 shows the TCP flows between a client (e.g., a source) and an IRC server (e.g., a destination) having few packets and Push/Ack flags (flag value 24) where the flow arrival times show a period around 90 seconds. Since the client is the source in the flow records, the flow records capture the IRC Pong messages. The Bytes per packet ratio (BPR) in this example is 65 Bytes, but depending on the IRC Pong message this size may vary based on the parameters passed to the message (namely the server names that is addressed to).

TABLE 1

An example of a set of flows

| Source IP | Destination IP | Packets | Bytes | Start Time | End Time | Source Port | Destination Port | Flags | Inter-arrival Time (sec) |
| --- | --- | --- | --- | --- | --- | --- | --- | --- | --- |
| a.b.c.d | q.w.e.r | 2 | 130 | 1131397179 | 1131397179 | 55300 | 6667 | 24 | |
| a.b.c.d | q.w.e.r | 4 | 260 | 1131397273 | 1131397364 | 55300 | 6667 | 24 | 94 |
| a.b.c.d | q.w.e.r | 2 | 130 | 1131397454 | 1131397454 | 55300 | 6667 | 24 | 90 |
| a.b.c.d | q.w.e.r | 2 | 130 | 1131397544 | 1131397544 | 55300 | 6667 | 24 | 93 |
| a.b.c.d | q.w.e.r | 2 | 130 | 1131397634 | 1131397634 | 55300 | 6667 | 24 | 90 |
| a.b.c.d | q.w.e.r | 2 | 130 | 1131397725 | 1131397725 | 55300 | 6667 | 24 | 91 |
| a.b.c.d | q.w.e.r | 2 | 130 | 1131397818 | 1131397818 | 55300 | 6667 | 24 | 93 |
| a.b.c.d | q.w.e.r | 2 | 130 | 1131397909 | 1131397909 | 55300 | 6667 | 24 | 91 |
| a.b.c.d | q.w.e.r | 2 | 130 | 1131397998 | 1131397998 | 55300 | 6667 | 24 | 89 |

In order to detect periodic patterns between suspicious clients and hub-servers, in one embodiment the present method uses a hierarchical Bayesian model. The flows are first separated for each client-server pair which have certain flags (Syn/Ack, Push/Ack or Ack) and sorted based on the start time of the flow. In one embodiment, the method then calculates the inter-arrival times of flows as the difference between the beginning of the current flow and end of the previous flow. The inter-arrival times are then analyzed. In one example, the Bayesian model described below in the WinBugs language is used to analyze the inter-arrival times.

```
model{
for (i in 1 :N) {
    dt [i]¯ dnorm (mu[i], tau)
    log (mu [i]) < −log (k2 [i]) + log (T)
    k2[i] < −round (k [i])
    k [i]¯ dunif (0.5, 10.49)
}
T¯dnorm (a, 20)
a¯dunif (85, 480)
tau¯dgamma (0.1, 0.1)
s < −/sqrt (tau) #stev
cv < −s/T #coef var
}
#init:
list (T=88)
#data:
```

$$\text{list}\left\{dt = c\begin{pmatrix} 94, 90, 93, 90, 180, 91, 93, 91, 89, 91, \\ 92, 92, 90, 91, 91, 93, 93, 89, 183, 89, 89, 91, 91, 91, \\ 91, 89, 89, 92, 88, 94, 182, 98, 91, 88, 91 \end{pmatrix},\right.$$
$$N = 35$$

The inter-arrival data dt [i] are modeled by normal distributions with means mu [i] and precision $\tau$, where the means are multiples of a fundamental period T, and $\tau$ is a function of standard deviation s: $\tau 1/s^2$. Allowing the mean to be a multiple of a fundamental period enables the detection of the fundamental period even when multiple observations are missing. The number of observations that may be missing is controlled by the model variable k[i]. In the example above, up to 10 missing observations are allowed. T is defined as a normal variable around a point a which is uniformly distributed in a region of typical periods. In one embodiment, accurate convergence of the simulation is achieved by Initializing T to be the minimum or the 25-th percentile of the data.

In another embodiment, the current method identifies controller host traffic on non-typical ports by modeling the known controller host traffic on typical ports and then comparing the traffic statistics to other ports with the same model. In one example, the model comprises of the following random variables: number of unique destination addresses (uda), flows per destination address (fpa), packets per flow (ppf), and bytes per packet (bpp). The method first creates the model by calculating the trimmed sample mean of the above random variables for established TCP connections (flow records that contain an Ack, Push or Urgent flags). The following steps are then performed to compare the data with the model:

The method pre-filters all flow records corresponding to established flows from suspicious addresses where the four variables fall within the range of values of the model while recording the destination port;

The method calculates the sample means of the four variables of the remaining flow records for each destination port which has at least a given number of source addresses connecting to;

The method removes the bottom and top 10% of the observed values and calculates the average of the remaining values to determine the trimmed means for the given port;

For each destination port, the method calculates Mahalanobis (if there is correlation between the variables) or Euclidean distance between the vectors of trimmed means of the given port to the model port;

The method sorts the destination ports based on ascending distance to obtain a list of candidate control ports "A";

Instead of distances, the method sorts the destination port based on the number of source addresses connecting to the given destination port to obtain a list of candidate control ports "B"; and If a destination port appears at the top of both lists A and B, then the method identifies the port as suspicious of being a control port.

For example, after validating that an IRC Botnet controller is running on port 6667, the method calculates the sample trimmed mean of the above four random variables to be: uda $\in (1,1)$, fpa $\in (1,19)$, ppf $\in (1,14)$, and bpp $\in (41,92)$. Since the typical control connections involve one controller for a single source address, the pre-filtering removes records where the suspicious source connects to more than one destination address given the above criteria of established TCP connections. The sample means for the other three variables during a period of one day are 5.7, 4.91 and 52.77, respectively. Assume that during the same period, suspicious clients to port 18067 had sample means 8.37, 2.4 and 49.99. The Euclidean distance is $$\sqrt{(5.7 - 8.37)^2 + (4.91 - 2.4)^2 + (52.77 - 49.99)^2} = 4.6.$$

The number of distinct source addresses connecting to suspicious ports are then calculated and sorted in descending order. The "suspicion order" is the average of the two ranks. The aggregate rank may then be re-sorted and integer values may be assigned based on the final order.

Once the candidate Bots and controller hosts are identified, the method classifies the Bots based on their behavior. The method provides a classification algorithm that creates and updates clusters of Bots based on their traffic profile. Recall that the hosts involved in the classification process are the ones that are deemed suspicious based on the two criteria of scanning and established connections to IRC or other hub-servers. The traffic for the suspicious hosts is examined in a predetermined interval, e.g. hourly, and the number of flow records where the destination port is application-bound is calculated. A destination port is considered application-bound if it is in the range of the Internet Assigned Numbers Authority (IANA) assigned ports (1-1023), or there are at least two flows from the suspicious host to distinct remote addresses on a high-numbered port (1024-65535). A concise, yet descriptive, representation of the traffic profile of a suspicious host is a vector of application-bound ports ranked by the number of flows observed. These vectors are used as input to the classification scheme.

One important aspect of the classification scheme is the definition of a similarity function S(i,j) between two vectors $v_i$ and $v_j$ representing a signature of the behavior of two suspicious hosts. Some of the desired properties of a similarity function are the following:

S(i,j) ∈ [0,];

Similarity increases if a port number exists in both vectors;

Similarity is a strictly decreasing function of the port rank; and

Similarity function is symmetric: S(i,j)=S(j,i).

One function that satisfies all of the above properties is the following:

$$S(i, j) = \frac{\sum_{k=1}^{M} I_k (M - O_{i,k} + 1)(N - O_{j,k} + 1)}{N(N+1)(2N+1)/6},$$

Where, M is the length of the shortest vector, N is the length of the longest vector, $I_k$ is the indicator function that the port with index k exists in both vectors $v_i$ and $v_j$, and $O_{i,k}$ and $O_{j,k}$ are the orders in which the port with index k appears in vectors $v_i$ and $v_j$, respectively.

For example, assume two vectors $v_i$=[445,25,53,18067]$^T$ and $v_j$=[25,53,136,139,445]$^T$.

Then, the similarity value is calculated based on the equation above, with M=4, N=5; and $$S(i, j) = \frac{\begin{array}{c}(4-1+1)(5-5+1)+\\(4-2+1)(5-1+1)+\\(4-3+1)(5-2+1)\end{array}}{\left(5 \cdot 6 \cdot \frac{11}{6}\right)} = 0.491.$$

Given an initial set of candidate Bots (e.g., hosts that have scanned and have established IRC or other hub-server connections within the same hourly interval), the above algorithm calculates the similarity for each pair of hosts and ranks the similarities with descending order. For the pairs with similarity larger than a threshold (e.g., 0.9), it determines whether or not any of them is already grouped. If none of the candidate Bots in the pair is grouped, then the algorithm starts a new group and calculates the traffic profile (vector of ranked application-bound ports) of the group. If one of the hosts is already grouped, then the algorithm adds the other host to the group. As new suspicious addresses (candidate Bots) are identified (in subsequent time intervals, e.g. 1 hour), the algorithm calculates their similarity to all of the existing groups and allocates them to the group with the highest similarity above the threshold. If there is no group in which the new suspicious addresses (candidate Bots) can be allocated (all similarities are below threshold), then the new suspicious addresses are allocated to a common pool. The algorithm then calculates similarities between all pairs of hosts in the pool and repeats the initial group formation process.

An example of how the above classification algorithm works is provided below. First, assume that there are no existing groups and that hosts A-E have been identified as being candidate Bots. The port-rank vectors are then formulated and the similarity function is applied for each pair. An exemplary set of similarity values is provided in Table 2 below:

TABLE 2

An Exemplary set of Similarity Values

| Suspicious Host | A | B | C | D | E |
|---|---|---|---|---|---|
| A | — | 1 | 0.91 | 0.1 | 0.2 |
| B |  | — | 0.8 | 0.3 | 0 |
| C |  |  | — | 0 | 0.7 |
| D |  |  |  | — | 0.97 |
| E |  |  |  |  | — |

Since there are no existing groups, the classification starts by examining the pairs with the highest similarity above the threshold, which in this example is set to 0.9 (such threshold allows groupings of similar but not necessarily identical port vectors): S(A,B)=1, S(D,E)=0.97, and S(A,C)=0.91. Hosts A and B are currently not grouped and therefore the algorithm forms the first group Group1 with A and B. Then, the algorithm examines pair D-E. Since there is already one existing group, D and E are compared individually against the vector representing the traffic profile of Group1. Given that the similarity values of D and E to A and B are small or zero, D and E would form a new group, Group2. Pair A-C has similarity 0.91, however A already belongs to a group, and C is assigned to the same group as A, which is Group1.

Next, assume that in the next time interval three new candidate Bots F,G, and H are identified and host C reappears. All hosts need to be compared to existing groups Group1 and Group2. If F has high similarity to Group1, G and H have zero similarity to any of the existing groups and C has strong similarity (above the threshold) to Group2 (recall here that C was initially assigned to Group1), then F is allocated to Group1, C's contribution to Group1 is removed and added to Group2, while G and H are added into the pool where the algorithm performs pair-wise comparisons between unallocated candidate Bots. If the similarity value between them is high and above the threshold, then a new group Group3 is created. Otherwise, G and H are not considered for group allocation.

As mentioned above, when groups are formed, a group port vector (equivalent to the group's traffic profile signature) is also calculated by aggregating the port ranks of the individual members that form the group. The new ranks are calculated based on the member ranks of the ports and the number of members that have contributed to a certain port rank. When a group is initially formed by two members, the port is assigned a rank that is the average of the ranks of the port in the two members. When a candidate Bot becomes member of a group, the ports are re-ranked based on the following criteria:

If the port exists in both vectors, the new rank of port k, $R_k^{new}$ is calculated as $$R_k^{new} = R_k^{old} + \frac{r_k}{N_k},$$

where $N_k$ is the number of members contributing to the rank of port k in the existing group and $r_k$ is the rank of the port of the new member to be added;

If the port exists in the port vector of the new member but not in the port vector of the group, the port is assigned a rank equal to a large number essentially putting it to the bottom of the rank of the group; and If the port appears only in the group port vector, it maintains its rank after the merging of the new member.

The final ranks are determined by sorting $R_k^{new}$. If the member is removed from a group, the term $$\frac{r_k}{N_k}$$

in the above equation is subtracted from the group rank term $R_k^{old}$. The classification algorithm allows the dynamic formation of groups (group expansion, shrinking, aging, etc.), tracking of group memberships and summarization of group profiles by group signatures. It is independent of the choice of the similarity function and robust in limitations in the data collection (e.g., one-way packet collection in flows, reduced number of collection points, etc.).

In one embodiment, the algorithm is implemented in software that produces two files for each identified group and one master membership file for all the hosts that were allocated to a group. The first group file contains summary information about the group such as the application-bound ports, the number of members of the group accessing a port and the time when the information was last updated. The second group file contains the IP addresses of the hosts belonging to the group, the ports that they accessed, and the last update time. The master membership file contains the IP addresses of the suspicious grouped hosts, the group that they belong to and the last update time. Examples of the output files are given below in Table 3.

TABLE 3

| Example of output files of classification algorithm |
|---|
| File: gma_10000001.txt |
| #Group Aggregate Port Information |
| #Port\|Number_of_members\|Last_updated |
| 445\|24\|2005102614 |
| 25\|24\|2005102614 |
| --- |
| File: gap_1000001.txt |
| #Group Member Address Information |
| #IPadress\|Ports_ranked\|Last_updated |
| a.9.184.67\|445,25\|2005100101 |
| b.121.13.98\|445,25\|2005100101 |
| c.140.212.26\|445,25\|2005100313 |
| d.140.222.170\|445,25\|2005100412 |
| e.166.113.174\|445,25\|2005100919 |
| f.169.208.145\|445,25\|2005101002 |
| ..... |
| --- |
| File: membdir.txt |
| #Member directory file |
| IPadress\|Group\|Last_updated |
| c.140.212.26\|10000001\|2005100313 |
| b.121.13.98\|10000001\|2005100101 |
| a.9.184.67\|10000002\|2005100101 |
| g.132.126.130\|10000002\|2005102811 |
| h.52.7.237\|10000003\|2005101521 |
| i.52.2.205\|10000003\|2005102308 |
| ..... |
| --- |

In one embodiment, the current invention classifies Botnets and identifies groups (members) based on synchronized scanning. It is expected that Bots receiving a command to start scanning for vulnerabilities on certain ports would start scanning around the same time. The scanning records identify the start time of scanning and the port that is being scanned along with the host IP address. The method of identifying potential Botnet members based on synchronized scanning comprises of: identifying ports with the most scanning records, grouping of host IP addresses if scanning starts within a time threshold T of another scanning record or the scanning targets a common port, and examining large groups for connections to a hub-server.

Table 4 illustrates an example with scanning detected on five largest groups. The table shows the number of members, the start time of scanning and the link where the scanning is detected for the five largest groups that were identified. From the table, one can see that further merging of groups may be possible based on the starting time of scanning. For example, the first, second and fourth groups started scanning only one second apart; and the third and fifth group started scanning only two seconds apart. Thus, the largest 5 groups may be merged to two groups forming thus larger groups. This reinforces the conjecture that scanning hosts are centrally controlled. In addition, one may also observe that all top 5 groups are seen on the same circuit (e.g., circuit x) indicating geographical/ISP localization of candidate Bots.

TABLE 4

| Scanning detected on five Largest Groups | | | |
|---|---|---|---|
| 5 Largest Groups | | | |
| Size | Start Time (sec) | Link | Circuit |
| 70 | 112132646 | Link_A | x |
| 67 | 112132647 | Link_A | x |
| 46 | 112135272 | Link_B | x |
| 44 | 112132648 | Link_A | x |
| 21 | 112135274 | Link_C | x |

The relationship between suspicious groups and controllers is not one-to-one. A suspicious group may be connecting to multiple controller hosts and vice versa. A controller host may also be used by multiple suspicious groups. Botnets often use dynamic Domain Name Systems (DNS) to locate their controllers. Such a service can dynamically map a DNS name to one or more IP addresses of controllers. For example, the IRC protocol specification allows multiple IRC servers to participate in a formation of a chat channel. A particular IRC server or other hub-server may be shared by multiple Botnets. It is also possible that due to network delays, activities that depend on the type of vulnerability discovered, Botnet partitioning, and other reasons, different parts of the same Botnet may be involved in different activities. The current method determines the allocation of the members of groups across different controllers.

In one embodiment, the present method first identifies the most suspicious hub-servers with the most distinct suspicious hosts connecting to them. Then, it finds the clients of the hub-servers and using the output of the classification algorithm finds which of the clients belong to what group. The output of this procedure identifies which members of the identified groups are connected to the same hub-server. Members of the same group connecting to the same hub-server are more likely to be part of the same Botnet. Table 5 provides an example of a distribution of connections of a group of suspicious hosts to a set of IRC servers.

TABLE 5

| Distribution of groups of suspicious hosts to controllers | | |
|---|---|---|
| Controller address (IRC server) | Number of group members | Fraction of group members |
| x1.248.44.13 | 859 | 42% |
| x2.91.35.66 | 306 | 22% |
| x3.178.53.154 | 222 | 10% |

The table above illustrates that a large portion of the group (e.g., 74%) has connections to a small set of controller (IRC) servers. These suspicious hosts may be part of the same Botnet where these three servers are the controllers or they could be three different Botnets with different controllers. Packet analysis may be used to further the classification based on the IRC channels that are used for control.

For example, when a controller server is identified as suspicious, its address may be tasked for packet trace collection. Packet traces provide validation that the server is used for control of Botnets and provides additional details, e.g., commands used for control, other servers involved, an expanded list of addresses belonging to the Botnet, the master hosts and user names issuing the controlling commands, etc.

In order to learn how a certain controller is used to support different activities, the present method needs to identify which of the Bots are allocated to a group and identify the group. The clients of a suspicious controller may be involved in different activities. For example, they may participate in a different channel that receives different commands from the master to perform distinct activities. For example, a cluster may contain suspect Bots which are scanning for vulnerability on port 135, while another cluster may contain Bots that are scanning ports 80 and 445 respectively. Another cluster may contain those that are scanning port 135 and have connections to port 25 (SMTP), to send spam, phishing content, or otherwise propagate viruses through email.

Figure 4:
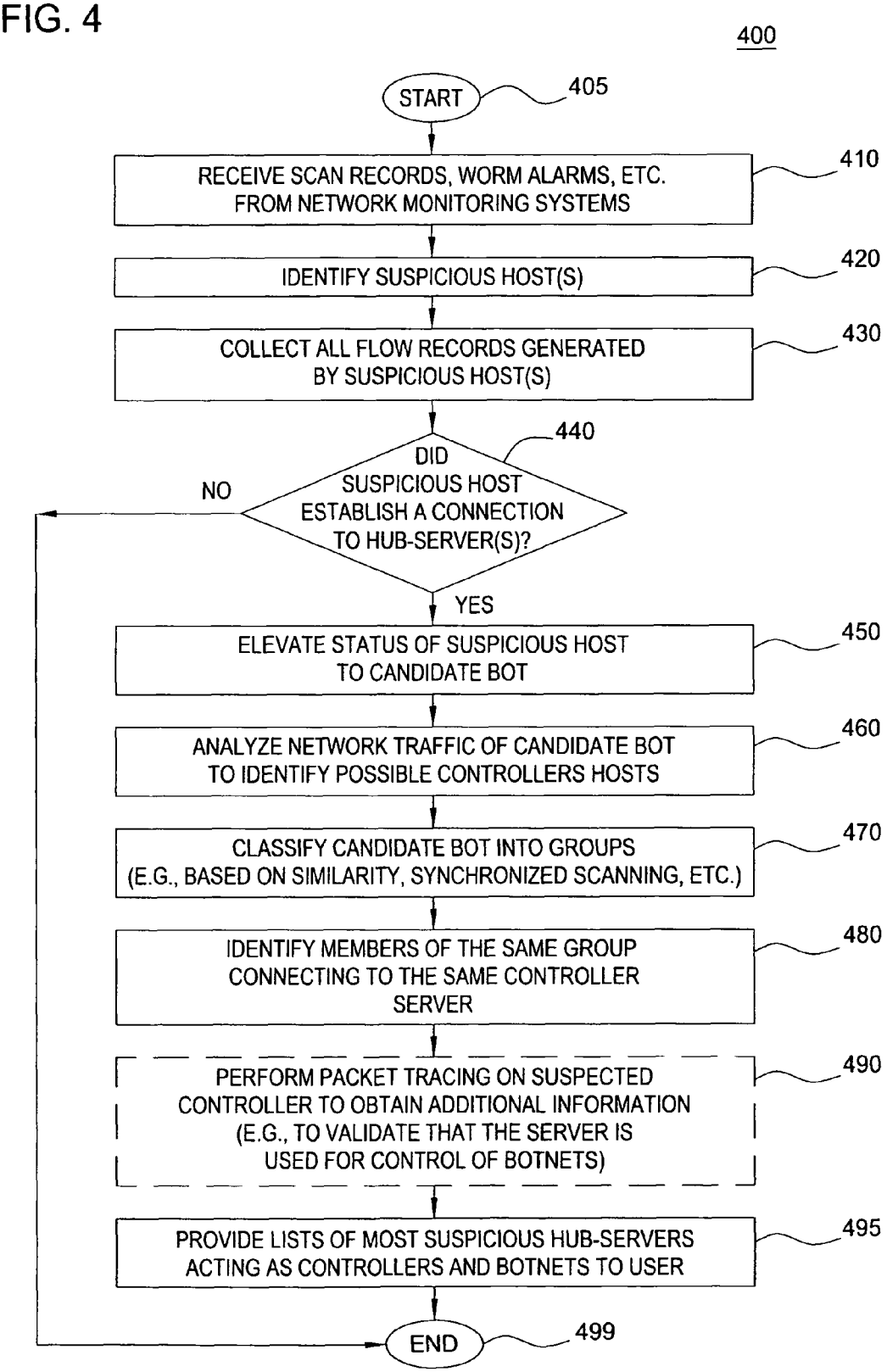
FIG. 4 illustrates a flowchart of a method for detecting Botnets.

FIG. 4 illustrates a flowchart of a method 400 of the current invention for detecting a Botnet. Network monitoring systems collect flow records for the traffic going through the network. The flow records may contain summary information about sessions, e.g., source and destination addresses and ports, the number of packets, number of bytes, the start and end times of the flow, the transport layer protocol used, etc.

Method 400 starts in step 405 and proceeds to step 410. In step 410, method 400 receives scan records, worm alarms, etc. from various monitoring systems. The scan records may identify computers performing scanning activity, circuits on which scanning activity has increased, ports being scanned, time periods of the scans, etc. Worm alarms may identify increases of sources scanning a particular port to find vulnerable applications.

In one embodiment, the service provider may use the scan records and worm alarms to adaptively select the circuits to be targeted for analysis, i.e., the circuits that are most likely to carry Botnet traffic. In another embodiment, the service provider monitors a fixed set of circuits and ports for Botnet activity, i.e., to perform a long term analysis of the circuits and ports that are frequently used by Botnets, and to establish a well known behavior pattern of Botnets using controller hosts, such as the IRC servers.

In step 420, method 400 identifies a list of suspicious hosts from the data received in step 410. The suspicious hosts may be computers that are included in scan and worm alarm records. It may also contain computers that may have been identified as suspicious by other systems, such as hosts that are involved in spamming, phishing, denial-of-service attacks, etc.

In step 430, method 400 collects all flow records generated by computers that are suspicious hosts (e.g., as identified in step 420). The flow records are collected for only the suspicious hosts to focus on the more relevant portion of the flow records (most likely to be part of a Botnet).

In step 440, method 400 determines whether or not each of the suspicious hosts has established a connection to a hub-server. For example, the method examines the flow records to determine what other activities are performed by these candidate Bots and whether or not it has established a connection to a hub-server (such as an IRC server). If a suspicious host has established a connection to a hub-server (such as the IRC server) in addition to having performed a scanning operation, the method proceeds to step 450. Otherwise, the method proceeds to step 499.

In step 450, method 400 elevates the status of suspicious host to a candidate Bot For example, the method adds the candidate Bot's IP address to a database containing a list of other candidate Bots. The method then proceeds to step 460.

In step 460, method 400 analyzes network traffic for the candidate Bots to identify possible controller hosts. For example, network traffic of the candidate Bots may be analyzed on typical IRC ports to identify controller hosts. Suspicious hub-servers which have multiple connections from many candidate Bots are analyzed to identify suspect controllers.

In one embodiment, the associations between suspicious hosts and suspicious hub-servers are built by processing flow records of suspicious hosts in predetermined intervals, e.g. hourly. The processing is performed on both the source and destination IP addresses of the flow records. The method first captures all flow records related to a set of suspicious hosts, storing the data based on keys that involve the 4-tuples (Iport, lip,rip,rport) as discussed above, parses the data in memory to find pairs (Iport,lip) that are associated with multiple rips or rports, and generates reports of such associations. In one embodiment, the reports may contain the following data for each "suspicious client-hub-server" association: client, hub-server, hub port, number of flows, number of packets, number of bytes, and timestamp of the first and last flow.

In another embodiment, the current method identifies controller host traffic on non-typical ports by modeling the known controller host traffic on typical ports and then comparing it to the traffic statistics of the suspicious hub-server.

In step 470, method 400 classifies candidate Bots based on their similarity of behavior. In one embodiment, the method calculates the similarity for each pair of suspicious hosts and ranks the similarities with descending order. For the pairs with similarity larger than a predetermined threshold (e.g., 0.9) it determines whether or not any of them is already grouped. If none of the suspicious hosts in the pair is grouped, the algorithm starts a new group and calculates the traffic profile (vector of ranked application-bound ports) of the group. If one of the hosts is already grouped the algorithm adds the other host to the group. As new suspicious addresses are identified (in subsequent time intervals, e.g. 1 hour), the algorithm calculates their similarity to all of the existing groups and allocates them to the group with the highest similarity above the threshold. If there is no group in which the new suspicious addresses can be allocated (all similarity below threshold), the new suspicious addresses are allocated to a common pool. The algorithm then calculates similarities between all pairs of hosts in the pool and repeats the initial group formation process.

In one embodiment, method 400 classifies Bots and identifies groups (members) based on synchronized scanning. The present method may use the scanning records that identify the start time of scanning and the port that is being scanned along with the host IP address. The ports with the most scanning records are first identified. The method then performs grouping of host IP addresses if scanning starts within a time threshold T of another scanning record, or the scanning targets a common port.

In step 480, method 400 identifies members of the same group connecting to the same controller server. These members are more likely to be part of the same Botnet. If packet tracing is provided for validation, the method then proceeds to step 490. Otherwise, it proceeds to step 495.

In optional step 490, method 400 performs packet tracing on suspected controllers to obtain additional information. For example, when a controller server is identified as suspect, its address may be tasked for packet trace collection that provides validations that the server is used for control of Botnets. Packet traces provide additional details, e.g. commands used for control, other servers involved, an expanded list of addresses belonging to the Botnet, identification of the master hosts, user names issuing the controlling commands, etc. The method then proceeds to step 495.

In step 495, method 400 provides lists of the most suspicious hub-servers acting as controllers, and Botnets (groups of clients that are connecting to them). The method then proceeds to step 499 to end processing the current detection or to step 410 to continue receiving input from monitoring systems.

Figure 5:
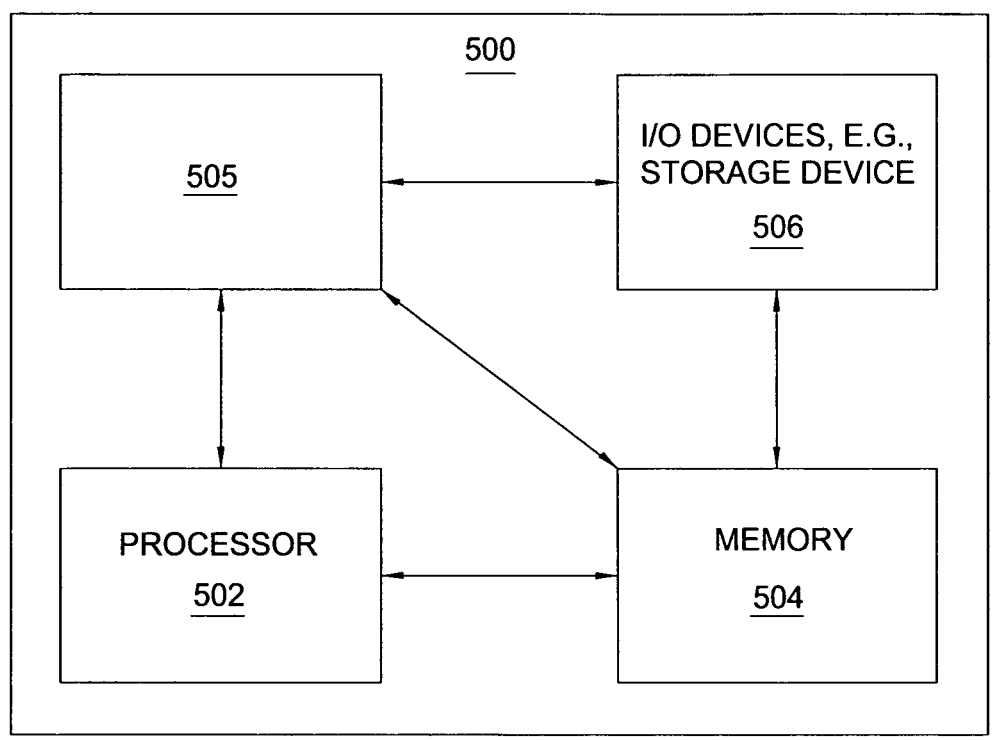
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for detecting Botnets, and various input/output devices 506 (e.g., network interface cards, such as 10,100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 505 for detecting Botnets can be loaded into memory 504 and executed by processor 502 to implement the functions as discussed above. As such, the present Botnet detection method 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a botnet, comprising:
    identifying, by a processor, a plurality of candidate bots, wherein the plurality of candidate bots is selected from a plurality of suspicious hosts, and wherein the identifying comprises identifying a set of hosts from the plurality of suspicious hosts that have established a connection to a hub-server, wherein the hub-server comprises an internet relay chat server, wherein the connection is associated with a local port of the hub-server and a respective remote Internet protocol address of each host of the set of hosts;
    analyzing, by the processor, network traffic of the plurality of candidate bots to identify a plurality of suspect controllers, wherein the analyzing comprises analyzing network traffic of the plurality of suspicious hosts that are identified as a candidate bot to identify a plurality of suspicious hub-servers, wherein the analyzing is performed in view of a local internet protocol address, the local port of the hub-server, a respective remote internet protocol address of each suspicious host of the plurality of suspicious hosts that is identified as a candidate bot, and a respective remote port of each of the plurality of suspicious hosts that is identified as a candidate bot;
    classifying, by the processor, the plurality of candidate bots into a group;
    identifying, by the processor, members of the group that are connected to a same controller from the plurality of suspect controllers, where the members are identified to be part of the botnet; and
    performing, by the processor, packet tracing to confirm the botnet, wherein the packet tracing validates that a controller of the plurality of suspect controllers is used for control of the botnet.

2. The method of claim 1, wherein the plurality of suspicious hosts is identified from a monitoring system.

3. The method of claim 2, wherein each of the plurality of suspicious hosts is identified as having performed a scanning activity.

4. The method of claim 1, wherein the classifying the plurality of candidate bots into a group comprises classifying in accordance with a similarity of behavior.

5. The method of claim 1, wherein the analyzing further comprises analyzing the network traffic to identify local port-local internet protocol address pairs that are associated with multiple remote internet protocol addresses.

6. The method of claim 1, further comprising:
    providing a list of suspect controllers from the plurality of suspicious hub-servers.

7. A tangible computer-readable medium storing a plurality of instructions which, when executed by a processor, cause the processor to perform operations for detecting a botnet, the operations comprising:
    identifying a plurality of candidate bots, wherein the plurality of candidate bots is selected from a plurality of suspicious hosts, and wherein the identifying comprises identifying a set of hosts from the plurality of suspicious hosts that have established a connection to a hub-server, wherein the hub-server comprises an internet relay chat server, wherein the connection is associated with a local port of the hub-server and a respective remote internet protocol address of each host of the set of hosts;
    analyzing network traffic of the plurality of candidate bots to identify a plurality of suspect controllers, wherein the analyzing comprises analyzing network traffic of the plurality of suspicious hosts that are identified as a candidate bot to identify a plurality of suspicious hub-servers, wherein the analyzing is performed in view of a local internet protocol address, the local port of the hub-server, a respective remote internet protocol address of each suspicious host of the plurality of suspicious hosts that is identified as a candidate bot, and a respective remote port of each of the plurality of suspicious hosts that is identified as a candidate bot;
    classifying the plurality of candidate bots into a group;
    identifying members of the group that are connected to a same controller from the plurality of suspect controllers, where the members are identified to be part of the botnet; and
    performing packet tracing to confirm the botnet, wherein the packet tracing validates that a controller of the plurality of suspect controllers is used for control of the botnet.

8. The tangible computer-readable medium of claim 7, wherein the plurality of suspicious hosts is identified from a monitoring system.

9. The tangible computer-readable medium of claim 8, wherein each of the plurality of suspicious hosts is identified as having performed a scanning activity.

10. The tangible computer-readable medium of claim 7, wherein the classifying the plurality of candidate bots into a group comprises classifying in accordance with a similarity of behavior.

11. The tangible computer-readable medium of claim 7, wherein the analyzing further comprises analyzing the network traffic to identify local port-local internet protocol address pairs that are associated with multiple remote internet protocol addresses.

12. The tangible computer-readable medium of claim 7, further comprising:
provide a list of suspect controllers from the plurality of suspicious hub-servers.

13. An apparatus for detecting a botnet, comprising:
a processor; and
a computer-readable medium storing a plurality of instructions which, when executed by the processor, cause the processor to perform operations, the operations comprising:
identifying a plurality of candidate bots, wherein the plurality of candidate bots is selected from a plurality of suspicious hosts, and wherein the identifying comprises identifying a set of hosts from a plurality of suspicious hosts that have established a connection to a hub-server, wherein the hub-server comprises an internet relay chat server, wherein the connection is associated with a local port of the hub-server and a respective remote internet protocol address of each host of the set of hosts;
analyzing network traffic of the plurality of candidate bots to identify a plurality of suspect controllers, wherein the analyzing comprises analyzing network traffic of the plurality of suspicious hosts that are identified as a candidate bot to identify a plurality of suspicious hub-servers, wherein the analyzing is performed in view of a local internet protocol address, the local port of the hub-server, a respective remote internet protocol address of each suspicious host of the plurality of suspicious hosts that is identified as a candidate bot, and a respective remote port of each of the plurality of suspicious hosts that is identified as a candidate bot;
classifying the plurality of candidate bots into a group;
identifying members of the group that are connected to a same controller from the plurality of suspect controllers, where the members are identified to be part of the botnet; and
performing packet tracing to confirm the botnet, wherein the packet tracing validates that a controller of the plurality of suspect controllers is used for control of the botnet.

* * * * *